M. B. GORDON.
AUTOMATIC FILM WINDING CAMERA.
APPLICATION FILED AUG. 9, 1919.
1,331,848.
Patented Feb. 24, 1920.
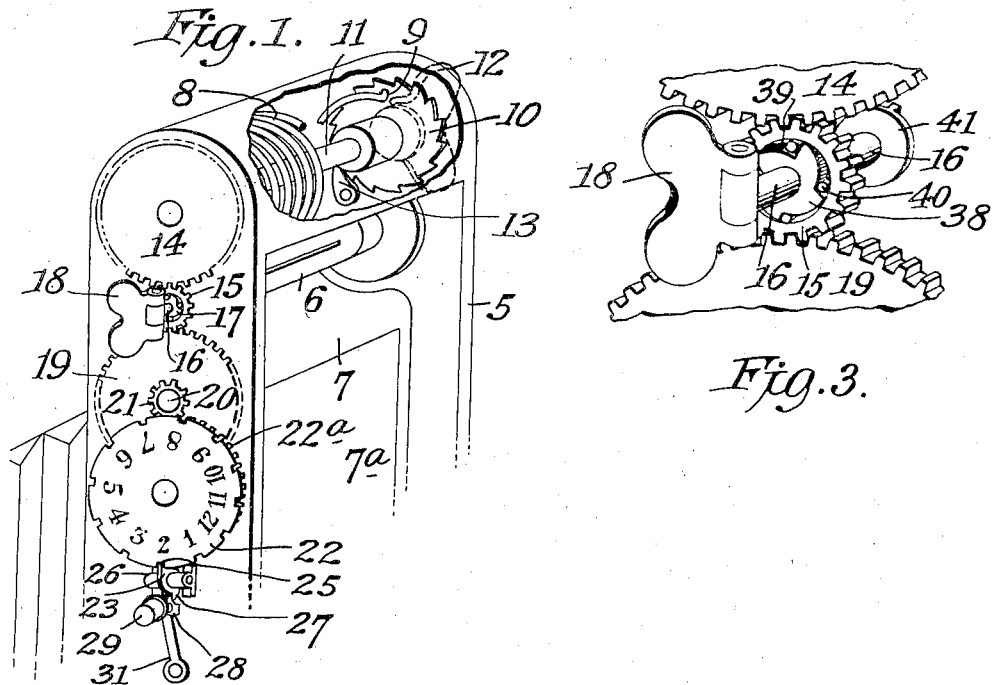
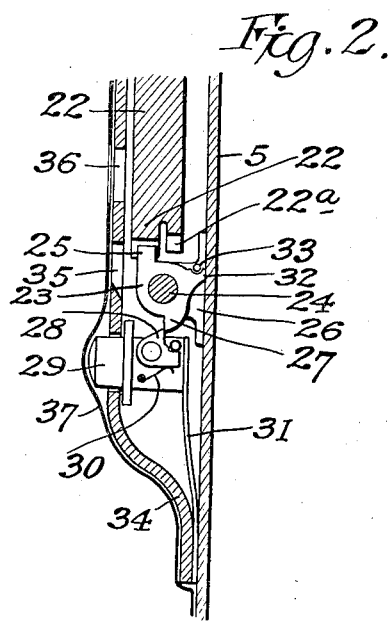
Myron B Gordon Inventor
By his Attorney Phillips Abbott

UNITED STATES PATENT OFFICE.

MYRON B. GORDON, OF WILKINSBURG, PENNSYLVANIA, ASSIGNOR TO ANSCO COMPANY, OF BINGHAMTON, NEW YORK, A CORPORATION OF NEW YORK.

AUTOMATIC FILM-WINDING CAMERA.

1,331,848.    Specification of Letters Patent.    Patented Feb. 24, 1920.

Application filed August 9, 1919. Serial No. 316,473.

*To all whom it may concern:*

Be it known that I, MYRON B. GORDON, a citizen of the United States, and a resident of the city of Wilkinsburg, county of Allegheny, and State of Pennsylvania, have invented a new and useful Improvement in Automatic Film-Winding Cameras, of which the following is a specification, reference being had to the accompanying drawings.

The object of this invention is to produce a new and improved mechanism whereby the film in film cameras may be automatically advanced from exposure to exposure by exceedingly simple manipulation on the part of the operator; a further object is to markedly simplify and reduce the cost of the means provided for shifting the film; and a further object is to provide new and improved means whereby double exposures will be prevented. The foregoing and other beneficial results flowing from the invention will be apparent from the following description of the mechanism and its method of operation.

In ordinary film cameras the sensitive film is shifted from exposure to exposure by turning the handle or key which engages the spool on which the film is wound as the successive exposures are made. This requires a considerable amount of time, prevents the making of exposures in quick succession and sometimes the forward winding of the film is neglected, with the result that a double exposure is made and both pictures spoiled. My invention contemplates a camera operating mechanism in which means are provided for simplifying and facilitating the taking of the pictures and for eliminating or reducing the danger of making double exposures.

In the drawings, Figure 1 is a perspective view of a camera embodying my invention, a part of the camera case and operating mechanism being broken away for convenience in illustration; Fig. 2 is a vertical sectional view on an enlarged scale of part of the mechanism illustrated in Fig. 1; Fig. 3 is a perspective view on an enlarged scale of another part of the mechanism illustrated in Fig. 1; Fig. 4 is another perspective view of the camera.

In the drawings I have illustrated the camera as of the folding type in which roll films may be employed. The camera is provided with a case 5 having a receiving spool 6 at one end on which the film is wound as the successive exposures are made. The supply or stock spool from which the film is unwound will of course be at the other end of the camera and is not shown. The case 5 is provided with the usual exposure boards 7, over which the film is drawn, and in which an aperture $7^a$ is provided, which defines the size of the picture.

In the embodiment of the invention illustrated the case 5 is lengthened beyond the receiving spool 6 sufficiently to inclose a spring 8, which, as shown, extends across the top of the case 5 and is helical in form. I have shown one end of this spring as attached at 9 to a ratchet wheel 10, the spring being broken away in the drawing for the purpose of more clear illustration. The ratchet wheel 10 is rotatably mounted upon a shaft 11, which extends from one side of the casing to the other and is connected with a winding handle or key 12, which, as usual, is located outside of the case 5. A pawl 13 is mounted on the interior of the case and engages the ratchet 10 and prevents it from turning except in the proper direction for winding up the spring 8. The end of the spring 8 opposite that which is attached to the ratchet wheel 10 is attached to the shaft 11 in any suitable manner, so that the spring tends to turn the shaft.

As illustrated the end of the shaft 11 remote from the ratchet wheel 10 projects through the side of the case 5 and a gear 14 is rigidly mounted on its projecting end and meshes, as shown, with a pinion 15 operatively connected to the film spool 6 by means of a shaft 16 and a clutch 17. I provide a winding handle 18 on the outer end of the shaft 16 whereby the film spool 6 may be turned by hand when desired.

As shown the pinion 15 meshes with a gear 19 which is rotatably mounted on a stud or axis 20 and which drives a concentric pinion 21, and meshing with the pinion 21 I provide a gear $22^a$ which is illustrated as rigidly connected to or integral with a disk 22 which is provided with twelve notches around its circumference, as shown, one notch being provided for each exposure to be made on the roll of film. It will of course be understood that in the camera illustrated the gear relation between the pinion 15 and the disk 22 is such that the disk will make one revolution during the operation of winding the film for the purpose of making twelve exposures. It will be noted that the notches on the disk are irregularly spaced so as to compensate for the gradually increasing diameter of the roll of film as it is successively wound upon the spool 6. In the apparatus illustrated the movement of the disk 22 and hence of the film spool is controlled by a stop 23 which is shown in a larger scale in Fig. 2. As there illustrated it is pivoted on a pin 24 and is provided with a notched engaging lug 25. The pinion 24 as shown is supported upon a bracket 26. The stop 23 is also provided with an extension 27 which is adapted to be engaged with a pawl 28 pivotally mounted upon a push button 29. A spring 30 is provided which yieldingly holds the pawl 28 in position to engage the extension 27 and a spring 31 engages with the inner end of the push button whereby it is returned to its normal position after it has been pressed inwardly to cause the stop 23 to release the disk 22. As shown the stop 23 is provided with a lug 32 which engages with a spring 33 which, while permitting movement of the stop upon its axis 24, returns it to normal position after each operation.

As shown in Fig. 2 the gears and stop mechanism are inclosed by a housing 34 which may be attached to the case 5 in any suitable manner. I have shown a hole 35 in the housing 34 to allow clearance for the lug 25 when the stop 23 is moved out of engagement with the notched disk 22. A hole 36 is likewise provided through which the numbers on the disk 23 may be observed, a number being provided for each exposure of the film. The housing 34 and the case 5 are preferably, but not necessarily, inclosed within a leather or other suitable covering 37.

Fig. 3 is an enlarged view of the clutch mechanism. As shown the clutch proper is inclosed or housed within the pinion 15 and it consists of a cam 38 secured to the shaft 16 and having a series of cam shaped faces 39 which coöperate with balls or rollers 40 so that in a manner well understood the shaft 7 may be turned in one direction by the handle 18 without disturbing the pinion 15 or the pinion 15 may be turned in the same direction by the gear 14 turning the shaft 16 and handle 18 with it. Clutches or over-running devices of this type are well known in this art and need no further description. On the inner end of the shaft 16 I illustrate a spool engaging member 41 adapted to engage the spool 6 in the usual manner.

Fig. 4 illustrates the camera of Fig. 1 completely assembled as shown. It is preferably provided with the usual window 42 for observing the position of the film in the camera.

The operation of the apparatus illustrated in Fig. 1 is as follows: A film is inserted in the camera in the usual manner and the handle 18 is turned until the first film is in the correct position for exposure. The spring 8 is wound up. The stop 23 should be in the notch marked 1. The exposure is made in the usual manner and after the shutter closes, the button 29 is pressed, thereby releasing the disk 22 and allowing the spring 8 to shift the film. As shown, the extension 27 on the stop 23 slips off the pawl 28 after the disk is released so that the stop is free to fall into the notch numbered 2, whether the button is held or not. When the stop 23 falls into the notch 2, the next exposure may be made. The spring 8 is preferably of such capacity as to shift the film twelve times. As the notches on the disk 22 are spaced to compensate for the increasing thickness of the roll of film on the spool 6, ordinary films may be used in the camera. After the last exposure has been made and the film has been shifted, the remainder of the film may be wound up in the usual manner, by turning the handle 18, thereby leaving the disk 22 in the correct position for a new roll of film. It will, of course, be understood that after the twelfth exposure has been made, the remainder of the film, including that exposure, may be wound up by hand, but in the mechanism shown the disk 22 would not be in the correct position for the first exposure of the next roll of film. It is also apparent that the disk 22 may be so geared and notched as to completely wind up the remainder of the film after the last exposure has been made.

The mechanism in its construction, combination and method of operation, is extremely simple, compact and relatively inexpensive. The spring 8, if properly made, will have ample capacity for shifting the whole roll of film without necessity for its rewinding. The film may be of the ordinary kind as the clutch 17 allows it to be adjusted to the first position in the usual manner and the spacing of the notches in the disk 22 in a very inexpensive and practical manner compensates for the increasing diameter of the roll as the film is intermittently wound up and the operation of shifting the film from one exposure to another is reduced to merely pressing the button and is therefore not likely to be forgotton and it also permits pictures to be taken in very rapid succession.

While I have illustrated my invention as applied to a folding camera I desire it to be understood that it may equally well be applied to cameras of the box type or practically any other type in which film, or its equivalent, is used as the sensitive element.

It will be obvious to those who are familiar with such matters that that which I have herein illustrated and described constitutes one form only in which my invention may be embodied and that various changes, modifications, substitutions, omissions and additions may be made in the apparatus illustrated and described without departing from the spirit and scope of my invention. I therefore do not limit myself to that which is specifically illustrated and described.

I claim:

1. In a film roll camera means for the automatic advance of the film embodying a receiving spool, a supply spool, a spring motor encircling an independent shaft at the end of the camera beyond the receiving spool, means on the exterior of the camera whereby the said shaft may be manually operated and the spring put under tension without moving any of the other parts, means whereby the receiving spool may be rotated by the motor and by devices independent thereof, gearing operated by the rotation of the receiving spool and connecting the shaft of that spool with a rotating index plate, and a manually operated stop mechanism upon the exterior of the camera adapted to lock the index plate and thus control the motor.

2. In a film roll camera means for the automatic advance of the film embodying a receiving spool, a supply spool, a spring motor encircling an independent shaft at the end of the camera beyond the receiving spool, means upon the exterior of the camera whereby the said shaft may be manually rotated and the spring put under tension without moving the other parts, means whereby the receiving spool may be rotated both by the motor and by devices independent thereof without moving any other part, gearing operated by the rotation of the receiving spool, a disk having notches thereon separated by gradually increasing distances, indicia upon the disk and a manually operated stop upon the exterior of the camera adapted to engage the notches in the disk.

In testimony whereof I have signed my name to this specification.

MYRON B. GORDON.